United States Patent Office 3,640,981
Patented Feb. 8, 1972

3,640,981
VINYL TOLUENE-ALPHA METHYL STYRENE COPOLYMERS AND METHOD OF PREPARING THE SAME
Bernard J. Davis, Pass Christian, Miss., assignor to Reichhold Chemicals, Inc., White Plains, N.Y.
No Drawing. Filed Apr. 23, 1969, Ser. No. 818,792
Int. Cl. C08f 15/04
U.S. Cl. 260—88.2 C    10 Claims

ABSTRACT OF THE DISCLOSURE

Copolymers of alpha methyl styrene and vinyl toluene are prepared by polymerizing said monomers in presence of phosphorus pentafluoride as a catalyst in an aromatic diluent or in a blend of aromatic and aliphatic diluents. In addition triphenyl phosphite is employed to protect the copolymer during stripping. Said method results in clear resins giving water white solutions in mineral spirits, which are odorless and substantially free from aromatics.

---

This invention relates to resinous copolymers of vinyl toluene and alpha methyl styrene that are soluble in aliphatic solvents with very low kauri butanol value, particularly pure isoparaffins, and to the production of such polymers.

Somewhat similar polymers are known to the art as described in U.S. Pat. No. 3,000,868. In said patent it is shown that copolymers of alpha methyl styrene and vinyl toluene are prepared by polymerizing the mixed monomers in an organic diluent, which may be an aromatic or aliphatic solvent or a mixture thereof, by the action of boron trifluoride or any of its complexes, then suitably neutralized and stripped to produce hard resins soluble in low kauri-butanol solvents, and that are light in color. While these resins are light in color, they are not crystal clear.

Moreover these polymers are limited to 35% maximum of alpha methyl styrene, the lower cost monomer, because higher percentages detract from yield and solubility when produced by the practiced art. Furthermore, such polymers are only soluble in so called low odor mineral spirits such as Varsol 3 [1] or Chemsol 143 [2] and exhibit cloudy solutions in odorless mineral spirits such as Isopar [3].

It is therefor an object of this invention to provide hard, water white copolymers of vinyl toluene and alpha methyl styrene that are soluble in the lowest solvency commercially available aliphatic solvents, particularly pure isoparaffins such as Isopar K.

A further object is to provide a method of making copolymers of alpha methyl styrene and vinyl toluene, that is simple, easily practiced, results in good yields, and is adaptable to either continuous or batch production.

These commercially available solvents compare as follows:

| | Percent aromatics | Flash point, °C. | Dist. range | Aniline cloud point, °F. |
|---|---|---|---|---|
| Isopar K (odorless mineral spirits) | 0.2 | 125 | 350-386 | 184 |
| Chemsol 143 (low odor mineral spirits) | 13.8 | 140 | 360-400 | 142 |
| Varsol 3 (low odor mineral spirits) | 10.5 | 107 | 325-346 | 144 |

I have surprisingly found that hard resins soluble in completely odorless mineral spirits (kauri butanol value 27) that are water white in color and crystal clear can be

[1] Manufactured by Esso Standard Oil Company, N.J.
[2] Manufactured by Ashland Refining Company, Newark, N.J.
[3] Manufactured by Esso Standard Oil Company, N.J.

produced from the same monomers by employing phosphorus pentafluoride as the catalyst and using a ratio of from about 40%–60% alpha methylstyrene to about 60%–40% vinyltoluene.

By varying the reaction temperature from about 0° C. to about 65° C. we can vary the melting point of the final resin from 130° C. to 100° C, or the higher the reaction temperature, the lower the ball and ring melt point of the final resin. Thus for example, a mixture of 50% alpha methyl styrene and 50% vinyl toluene run at 20 C., provides a resin with a 100 melt point. The same combination run at 10° C. provides a melt point of 130° C.

The copolymers of this invention are formed by contacting the vinyl toluene and alpha methyl styrene monomers with phosphorus pentafluoride. This contact may take place by bubbling gas into the mixture of said monomers. But it is preferred to have them react in the presence of an inert solvent, since the rate of the reaction is mitigated by the use of a diluting solvent. Such solvents can be pure aromatic type solvents such as marketed by Esso Standard Oil Company as Solvesso 150 or blends of such a solvent with V.M. & P. naphtha of mineral spirits. Other aromatics such as Solvesso 100, ethyl benzene, cumene, xylene, toluene or benzene can be employed; or they can be pure aliphatic type solvents, such as, V.M. & P. naphtha, mineral spirits, hexane, heptane or many others.

For most purposes it is preferred that the reactants be used in the proportion of, by weight 50% alpha methyl styrene and 50% vinyl toluene. These proportions are productive of copolymers of optimum freedom from color, excellent solubility in non-aromatic solvents, and in excellent yield. Melting points can be adjusted by small variations in the alpha methyl styrene content, and for all purposes the range of alpha methyl styrene concentration is covered by the values 40% to 60% by weight. The vinyl toluene employed can be present in many of its isometric forms.

The melting point of the resultant polymer can also be controlled by varying the concentration of the monomers employed in a non-relative diluent.

These non-reactive diluents are aliphatic or aromatic solvents or mixtures thereof. These solvents must be water and olefin free.

Normally, aliphatic reaction solvents provide higher melt points. Aromatics have a slight tendency to act as chain transfer agents and terminators.

In the preferred practice of the invention, phosphorus pentafluoride gas is bubbled into the solution of the monomers. The reaction will initiate and go to completion with as little as .025% phosphorus pentafluoride gas based on the weight of monomers employed. As much as 1.0% can be employed but this is wasteful. Also, phosphorus pentafluoride in any of its well known complexes that are Friedel-Crafts active catalysts can be employed instead of the gas.

We have also found that the addition of 0.1% trialkyl or triaryl phosphite based on the monomers, and added just prior to stripping protects the resin during this vigorous treatment to provide maximum clarity.

Representative trialkyl and triarylphosphites are triethyl phosphite, tripropylphosphite, triisopropylphosphite, tributylphosphite, trihexylphosphite, trioctylphosphite, tridecylphosphite and the like as well as triphenylphospite, tricresylphosphite, diphenyloctylphosphite, diphenyldecylphosphite, dioctylphenylphosphite, didecylphenylphosphite and the like. The preferred phosphites are triphenyl and tridecylphosphite on account of outstanding results achieved therefrom.

Normal care should be employed in the raw materials used. For example, the monomers should be polymer free and the solvents free of Friedel-Crafts polymerizable contaminants such as olefins, or Friedel-Crafts poisons such as alcohols, aldehydes, peroxides, and amines, which tend to inactivate said catalyst. All components should ideally not contain more than 40 parts per million water.

The resins produced by this reaction can be recovered by any of the well recognized procedures known to the art.

For example, the catalyst can be quenched and removed by water washing and suitable alkali washing, simply boiled off, or dry neutralized with hydrated lime and attapulgus clay (attapulgus clay is supplied by Minerals & Chemicals Phillip Corp., Menlo Park, N.J.). This is a well known commercial product and is referred to in Reinhold's "The Condensed Chemical Dictionary," sixth edition, page 1018. We prefer the dry neutralization and employ 1% lime and 1% clay based on the monomers, when using 0.1% catalyst. The clay and lime are proportionately changed when using more or less catalyst. In practice, the reaction mixture is heated to 20–25° C. the lime carefully added first, followed by the clay, then the temperature is raised to 90° C. and held for ½ hour. The product is then filtered, and 0.1% triphenyl phosphite or tridecylphosphite based on the monomers is added. The product is then inert gas sparged to 200° C. then steam sparged to 240° C. It is held at this temperature while steam sparging until the water to oil ratio in the condenser receiver is 9.8 to 0.2.

In this way there are produced water white, crystal clear copolymers and that are soluble in odorless mineral spirits down to 0° C. The low kauri butanol solvent that can be employed for the solubility tests are for example Isopar K which is an isoparaffinic solvent that is odorless with a kauri butanol value of 27, and other odorless mineral spirits with kuari butanol value of 30 or less. Regular mineral spirits have a kauri butanol value of approximately 35–40 depending on the source, but these solvents contain aromatics and have a pronounced odor.

Such resins find utility in hot melt wax modified adhesives and coatings, overprint varnishes, printing inks, decorative and protective coatings, pressure sensitive adhesives, xerographic paper, and dry cleaning dry size.

In order that those skilled in the art may better understand our invention, the following examples are given which are illustrative of the preparation of our invention but are not intended for purposes of limitation.

EXAMPLE I

To a 5-liter flask equipped with stirrer, thermometer, reflux condenser, inert gas inlet, addition funnel and a cooling bath was added 1805 grams commercial heptane (olefin free). This system was purged with nitrogen while the contents of the flask were cooled to 15° C. Phosphorus pentafluoride gas was then introduced below the surface of the xylol (1.05 grams or about 0.1% on monomers was employed). 525 grams redistilled alpha methyl styrene and 525 grams redistilled vinyl toluene were premixed and addition of the monomer mix started and added at such a rate that a reaction temperature of 20° C. was maintained with a cooling bath of 0° to 5° C.

The monomers were added in one hour and the reaction held at 20–25° C. for an additional hour. 2.62 grams hydrated lime and 2.62 grams attapulgus clay were then added and the reaction mass heated to 90° C. After holding at 90° C. for ½ hour, the mixture was filtered and 1.1 grams tridecyl phosphite was added.

The clear resin solution was nitrogen sparged while heating to a temperature of 200° C. Sparging was then continued by means of steam to a pot temperature of 240° C. and maintained at this temperature until the condensate from the condenser showed a 9.8 to 0.2 water to oil ratio. The completed resin was then poured into cooling pans.

958 grams of a crystal clear water white resin was obtained (91.3% yield based on monomers). The resin had a ring and ball softening point of 101° C., a specific gravity of 1.03. The resin was completely soluble in Isopar K and demonstrated a Gardner viscosity at 50% solids in Isopar K of M to I and a 65% solids viscosity in Isopar K of $Z_4$.

EXAMPLES II TO IX

The following table demonstrates the results of varying modifications. All were run as shown in Example I.

TABLE I

| Example No. | Percent alpha methyl styrene | Percent vinyl toluene | Reaction temp., °C. | Diluent | Percent diluent | Percent $PF_5$ | Resin melt point, °C. | Yield, percent | Color | 50% solubility in Isopar K |
|---|---|---|---|---|---|---|---|---|---|---|
| II | 50 | 50 | 20 | Xylol | 65 | 0.1 | 56.5 | 90.6 | WW | Excellent. |
| III | 50 | 50 | 20 | Heptane | 75 | 0.1 | 110.5 | 93.0 | WW | Do. |
| IV | 50 | 50 | 10 | ...do... | 65 | 0.1 | 130 | 92.3 | WW | Do. |
| V | 45 | 55 | 20 | ...do... | 65 | 0.1 | 120 | 92.3 | WW | Do. |
| VI | 40 | 60 | 20 | ...do... | 65 | 0.1 | 131.5 | 94.2 | WW | Do. |
| VII | 55 | 45 | 20 | ...do... | 65 | 0.1 | 92 | 91.3 | WW | Do. |
| VIII | 60 | 40 | 20 | ...do... | 65 | 0.1 | 81 | 91.5 | WW | Do. |
| IX | 35 | 65 | 35 | {Solvesso 100 [1], Solvesso 100} | 50 | 0.1 | 120 | 91.0 | WW | Poor. |

[1] Manufactured by Esso Standard Oil Company, N.Y., N.Y.
NOTE.—The resin prepared in accordance with Example IX was however completely soluble in Chemsol 143 and Varsol 3, which were cited above.

Thus, as seen from the foregoing Table I, the resins currently known to the art require solvents with at least 10% aromatics to stay in solution while resins of this invention are soluble in essentially pure aliphatic solvents.

It also can be seen that optimum yields are achieved by utilizing the preferred ratio of about 40% alpha methylstyrene and about 60% vinyltoluene.

What is claimed is:

1. A method of preparing an alpha methyl styrene vinyl toluene copolymer comprising subjecting a mixture consisting essentially of, by weight from about 40 to about 60 percent of monomeric alpha methyl styrene and from about 60 to about 40 percent of vinyl toluene to a polymerizing reaction in the presence of a catalyst consisting essentially of a member of a group consisting of phosphorous pentafluoride and its Friedel-Crafts active complexes, thereby producing a copolymer of alpha methyl styrene and vinyl toluene, and recovering said copolymer.

2. The method according to claim 1 wherein the copolymerization takes place in the presence of a solvent selected from a group consisting of aromatic and aliphatic solvents and mixtures thereof.

3. A method of preparing alpha methyl styrene-vinyl toluene copolymer according to claim 1 wherein said solvent is free from resin forming and catalyst inactivating compounds.

4. A method according to claim 1 wherein said alpha methyl styrene and vinyl toluene is free from preformed polymers and catalyst inactivating compounds.

5. A method of preparing an alpha methyl styrene-vinyl toluene copolymer according to claim 2, wherein said mixture is subjected to phosphorus pentafluoride and said phosphorus pentafluoride is neutralized, filtered and wherein the solvent is stripped off and the copolymer is recovered.

6. A method of preparing an alpha methyl styrene-vinyl toluene copolymer according to claim 2, wherein said mixture is subjected to a catalyst consisting essentially of a member of a group consisting of gaseous phosphorus pentafluoride and its Friedel-Crafts active complexes, thereby producing a copolymer of alpha methyl styrene and vinyl toluene; said copolymer being subsequently neutralized, filtered and stripped from said solvent, to produce a hard resin soluble in odorless mineral spirits, having a kauri butanol value of about 27 at a temperature of about 0° C.

7. A method of preparing an alpha methyl styrene vinyl copolymer according to claim 5 wherein a phosphite, selected from the group consisting of trialkylphosphites and triarylphosphites, is added immediately subsequent to filtration to provide a crystal clear copolymer, soluble in mineral spirits having a kauri butanol value of about 27.

8. A method of preparing an alpha methyl styrene vinyl toluene copolymer according to claim 6, wherein a phosphite selected from the group consisting of trialkyl and triarylphosphites is added immediately subsequent to filtration to provide a crystal clear copolymer, soluble mineral spirits having a kauri butanol value of about 27.

9. A method according to claim 1 wherein the catalyst is employed within the range of approximately 0.025% to 1% based on the weight of the monomers.

10. Resin consisting essentially of a copolymer of, by weight, about 40% to about 60% alpha methyl styrene and about 60% to about 40% of vinyl toluene, said resin being essentially water white in color, with softening points (Ball and Ring) up to 130° C. and with complete solubility in odorless mineral spirits at temperatures of about 0° C., said odorless mineral spirits having kauri values of about 27.

References Cited

UNITED STATES PATENTS

| | | | |
|---|---|---|---|
| 3,000,868 | 9/1961 | Powers | 260—88.2 |
| 3,008,937 | 11/1961 | Ruffing et al. | 260—85.5 |
| 3,264,244 | 8/1966 | Ambler | 260—29.6 |

OTHER REFERENCES

Olah, "Friedel-Crafts and Related Reactions," vol. I, Interscience Publishers (pp. 267–268) New York, N.Y., 1963.

JOSEPH L. SCHOFER, Primary Examiner

R. A. GAITHER, Assistant Examiner